(12) United States Patent
Cavin et al.

(10) Patent No.: US 10,878,236 B2
(45) Date of Patent: *Dec. 29, 2020

(54) EYE TRACKING USING TIME MULTIPLEXING

(71) Applicant: Facebook Technologies, LLC, Menlo Park, CA (US)

(72) Inventors: Robert Dale Cavin, Seattle, WA (US); Alexander Jobe Fix, Seattle, WA (US); Andrew John Ouderkirk, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/657,346

(22) Filed: Oct. 18, 2019

(65) Prior Publication Data

US 2020/0050851 A1 Feb. 13, 2020

Related U.S. Application Data

(63) Continuation of application No. 15/669,572, filed on Aug. 4, 2017, now Pat. No. 10,489,648.

(51) Int. Cl.
*G06K 9/00* (2006.01)
*G06K 9/20* (2006.01)
*G06T 7/73* (2017.01)

(52) U.S. Cl.
CPC ..... *G06K 9/00604* (2013.01); *G06K 9/00617* (2013.01); *G06K 9/2027* (2013.01); *G06T 7/74* (2017.01); *G06T 2207/30201* (2013.01)

(58) Field of Classification Search
None
See application file for complete search history.

(56) References Cited

U.S. PATENT DOCUMENTS 8,824,779 B1 * 9/2014 Smyth ............... G06T 7/593
382/154
8,971,570 B1 * 3/2015 Raffle ............... G06F 3/013
382/103

(Continued)

FOREIGN PATENT DOCUMENTS

WO WO 2014/071332 A1 5/2014
WO WO 2016/029433 A1 3/2016
WO WO 2017/074662 A1 5/2017

OTHER PUBLICATIONS

W. Pichitwong and K. Chamnongthai, "3-D gaze estimation by stereo gaze direction," 2016 13th International Conference on Electrical Engineering/Electronics, Computer, Telecommunications and Information Technology (ECTI-CON), Chiang Mai, 2016, pp. 1-4, doi: 10.1109/ECTICon.2016.7561491.*

(Continued)

*Primary Examiner* — Mohammad J Rahman
(74) *Attorney, Agent, or Firm* — Fenwick & West LLP

(57) ABSTRACT

A head mounted display (HMD) comprises an eye tracking system configured to enable eye-tracking using light. The eye tracking system implements time-multiplexing by configuring a source assembly comprising a plurality of light sources to project at least a first light pattern towards the user's eye over a first time period, and a second light pattern towards the user's eye over a second time period in accordance with a set of emission instructions. A camera assembly is configured to capture images of the user's eye during the first and second time periods in accordance with a set of imaging instructions, the captured images containing one or more glints corresponding to reflections of the first or second light patterns on the cornea of the user's eye. The location of the glints may be used to determine a shape or orientation of the eye.

20 Claims, 7 Drawing Sheets

(56) References Cited

U.S. PATENT DOCUMENTS

| | | | |
|---|---|---|---|
| 9,498,125 B2 | 11/2016 | Caraffi et al. | |
| 2006/0110008 A1* | 5/2006 | Vertegaal | G06T 7/251 |
| | | | 382/103 |
| 2008/0002863 A1* | 1/2008 | Northcott | A61B 3/1216 |
| | | | 382/117 |
| 2008/0137944 A1 | 6/2008 | Marchesotti et al. | |
| 2010/0245093 A1* | 9/2010 | Kobetski | G06K 9/00597 |
| | | | 340/576 |
| 2012/0105486 A1* | 5/2012 | Lankford | G06F 3/0481 |
| | | | 345/661 |
| 2013/0107214 A1* | 5/2013 | Blixt | A61B 3/0008 |
| | | | 351/210 |
| 2014/0375790 A1 | 12/2014 | Robbins et al. | |
| 2015/0131051 A1 | 5/2015 | Huang | |
| 2015/0193920 A1 | 7/2015 | Knee et al. | |
| 2015/0288944 A1 | 10/2015 | Nistico et al. | |
| 2016/0210497 A1 | 7/2016 | Rougeaux | |
| 2016/0270655 A1* | 9/2016 | Caraffi | A61B 3/0025 |
| 2016/0363995 A1* | 12/2016 | Rougeaux | G02B 27/017 |
| 2017/0123488 A1 | 5/2017 | Guenter et al. | |
| 2017/0286659 A1 | 10/2017 | Xiao | |
| 2018/0137384 A1 | 5/2018 | Kim | |
| 2018/0239423 A1 | 8/2018 | Mardanbegi et al. | |

OTHER PUBLICATIONS

A. A. Akinyelu and P. Blignaut, "Convolutional Neural Network-Based Methods for Eye Gaze Estimation: A Survey," in IEEE Access , vol. 8, pp. 142581-142605, 2020, doi: 10.1109/ACCESS.2020.3013540.*

PCT International Search Report and Written Opinion, PCT Application No. PCT/US2018/044829, dated Nov. 14, 2018, 16 pages.

* cited by examiner

EYE TRACKING USING TIME MULTIPLEXING

CROSS REFERENCE TO RELATED APPLICATIONS

This application is a continuation of co-pending U.S. application Ser. No. 15/669,572, filed Aug. 4, 2017, which is incorporated by reference in its entirety.

BACKGROUND

The present disclosure generally relates to eye tracking, and specifically to eye tracking using a time multiplexed illumination source.

Eye tracking is an important feature for head-mounted display (HMD) systems including systems used in virtual reality (VR) applications. By tracking an orientation of a user's eye, the HMD display system may be able to adjust the content being displayed to the user in order to improve clarity and immersion. The HMD may also allow the user to interact with virtual content based upon the user's eye orientation (e.g., the user may select a displayed virtual object by staring at the object).

In some cases, eye tracking may be performed by projecting a light pattern comprising a plurality of light beams towards the eye of the user, and detecting the locations of reflections, referred to as glints, on the user's eye resulting from the projected light pattern. However, some of the reflected glints may be obscured by the user's pupil, eyelids, or eyelashes. In some cases, different glints may be detected more accurately or identified with better signal-to-noise ratio (SNR), based upon the orientation of the user's eye and/or variations in geometry between the eyes of different users. In addition, the number and intensity of the light beams that can be projected at a time towards the user's eye may be limited due to safety reasons, potentially reducing the number and intensity of the reflected glints.

SUMMARY

A head mounted display (HMD) includes an eye tracking system. The HMD can be used in a VR system environment or other system environments, such as an augmented reality (AR) or mixed reality (MR) system. The eye tracking system includes a source assembly configured to emit light towards an eye of a user of the HMD in accordance with a set of emission instructions. The emission instructions may instruct the source assembly to emit a first light pattern towards the eye of the user over a first time period, and to emit a second light pattern towards the eye of the user over a second time period. Each light pattern comprises a plurality of light beams projected towards different locations on the user's eye, each of the light beams able to be reflected by the cornea of the eye to produce a corresponding glint.

The eye tracking system further comprises a camera assembly configured to capture images of a cornea of the eye over at least the first and second time periods in accordance with a set of imaging instructions. The captured images may be analyzed to identify one or more glints corresponding to the first light pattern or the second light pattern. In some cases, one or more glints corresponding to the first light pattern or the second light pattern may be obscured, such as by a pupil of the eye for certain orientations of the eye.

The eye tracking system further comprises a controller in communication with the source assembly and the camera assembly. The controller is configured to receive and analyze the one or more captured images of the cornea of the eye to identify one or more glints from the captured images over the first and second time periods. The identified glints may comprise least a first subset of glints associated with the first light pattern and a second subset of glints associated with the second light pattern.

The controller is further configured to determine a shape or orientation of the eye based upon the identified glints from the captured images. By projecting different light patterns over the eye over different time periods, the controller may be able to identify a sufficient number of unobscured glints from the captured images to accurately determine a shape or orientation of the eye.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
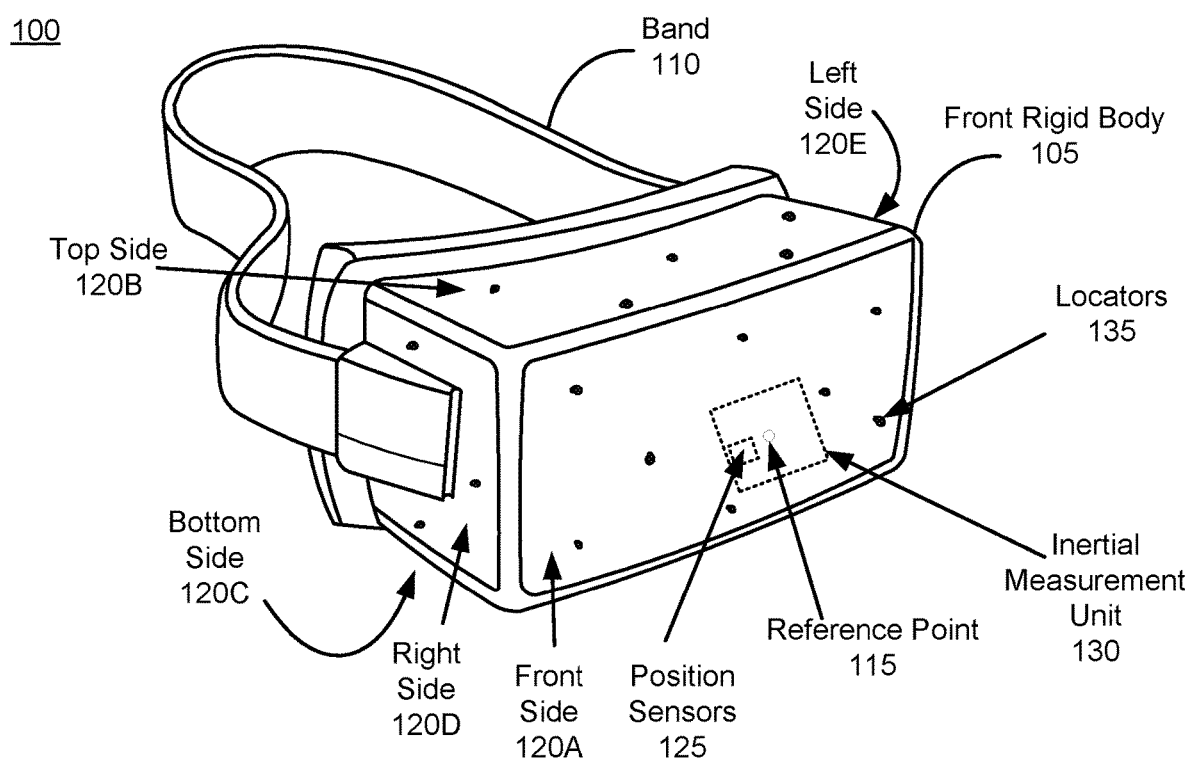
FIG. 1 is a diagram of a head mounted display (HMD), in accordance with an embodiment.

FIG. 1 is a diagram of an HMD 100, in accordance with an embodiment. The HMD 100 may be a part of, e.g., a VR system, an AR system, a MR system, or some combination thereof. The HMD 100 includes a front rigid body 105 having a front side 120A, top side 102B, bottom side 120C, right side 120D, and left side 120E, and a band 110. In embodiments that describe AR system and/or a MR system, portions of a front side 120A of the HMD 100 are at least partially transparent in the visible band (~380 nm to 750 nm), and portions of the HMD 100 that are between the front side 120A of the HMD 100 and an eye of the user are at least partially transparent (e.g., a partially transparent electronic display).

The front rigid body 105 may include a combination of one or more electronic displays (not shown in FIG. 1), an inertial measurement unit (IMU) 130, one or more position sensors 125, and one or more locators 135. In the embodiment shown by FIG. 1, the position sensors 125 are located within the IMU 130, and neither the IMU 130 nor the position sensors 125 are visible to the user.

The locators 135 may be located in fixed positions on the front rigid body 105 relative to one another and relative to a reference point 115. In the example of FIG. 1, the reference point 115 is located at the center of the IMU 130. Each of the locators 135 may emit light that is detectable by an imaging device (e.g., an imaging device 635 illustrated in FIG. 6, described in greater detail below). In some embodiments, the locators 135 may comprise passive elements (e.g., a retroreflector) configured to reflect light from a light source that may be detectable by an imaging device. Locators 135, or portions of locators 135, are located on the front side 120A, the top side 120B, the bottom side 120C, the right side 120D, and/or the left side 120E of the front rigid body 105 in the example of FIG. 1. The imaging device may be configured to determine a position and/or an orientation of the HMD 100 based upon the detected locations of the locators 135, which may be used to determine the content to be displayed to the user. For example, where the HMD 100 is part of a VR system, the position and orientation of the HMD 100 may be used to determine which virtual objects positioned in different locations in a virtual world may be visible to the user of the HMD 100.

Figure 2:
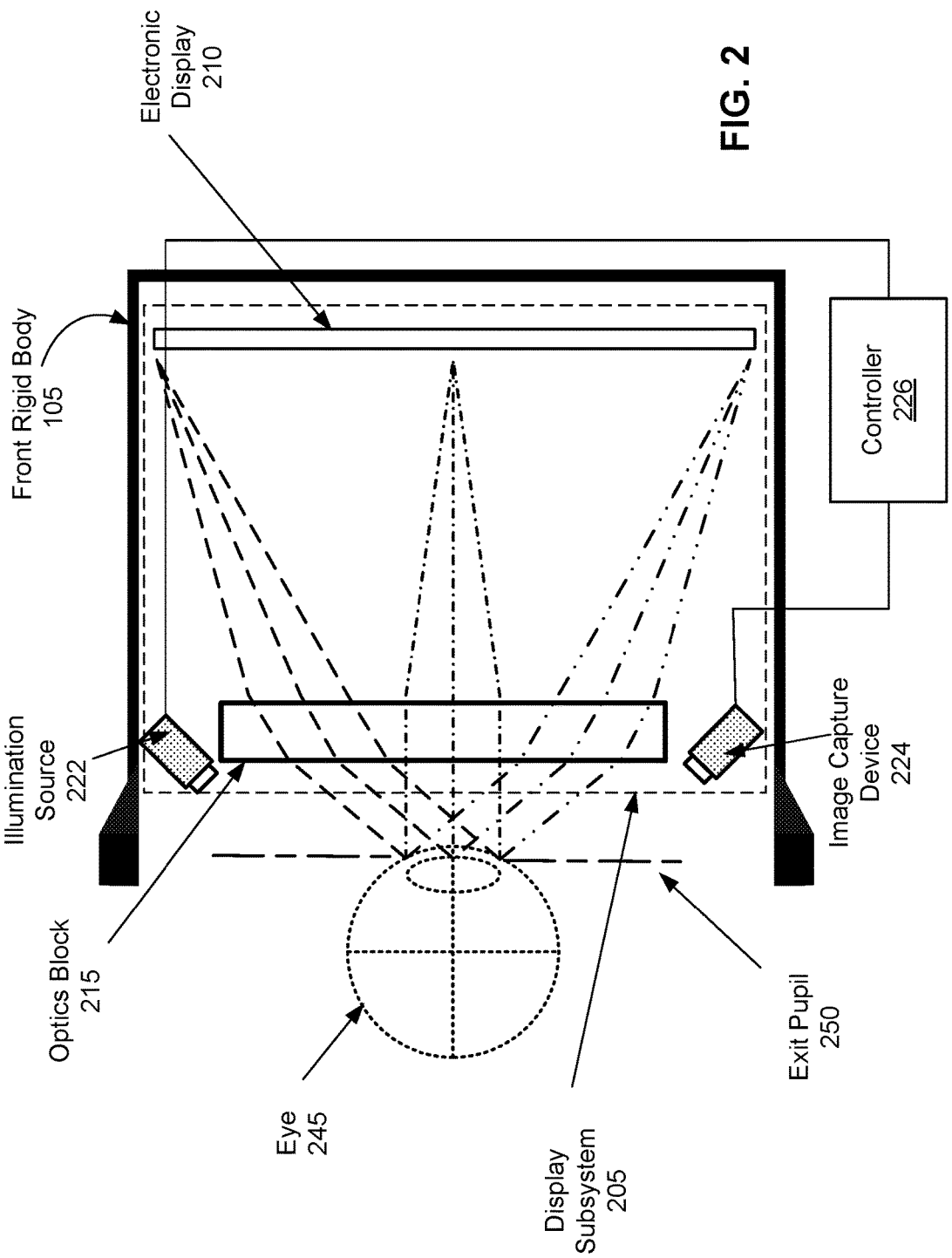
FIG. 2 is a cross section of a front rigid body of a HMD containing an eye tracking system, in accordance with an embodiment.

FIG. 2 is a cross section 225 of the front rigid body 105 of the embodiment of the HMD 100 shown in FIG. 1. As shown in FIG. 2, the front rigid body 105 includes a display subsystem 205 that provides altered image light to an exit pupil 250. The exit pupil 250 is the location of the front rigid body 105 where a user's eye 245 is positioned. For purposes of illustration, FIG. 2 shows the cross section 225 associated with a single eye 245. However, it is understood that in some embodiments, the display subsystem 205 may provide altered image light to both eye of the user. In some embodiments, another display subsystem within the front rigid body 105, separate from the display subsystem 205, may provide altered image light to another eye of the user.

The display subsystem 205 includes an electronic display 210, an optics block 215, and an eye tracking system (described in greater detail below). The electronic display 210 emits image light toward the optics block 215. The optics block 215 may magnify the image light, and in some embodiments, also correct for one or more additional optical errors (e.g., distortion, astigmatism, etc.). The optics block 215 directs the image light to the exit pupil 250 for presentation to the user.

The eye tracking system tracks a position of the eye 245. The eye tracking system comprises a source assembly having a plurality of illumination sources 222 (only one illumination source 222 is shown in the figure), an image capture device 224, and a controller 226. Although only one eye 245 of the user is shown in FIG. 2, in some embodiments, the eye tracking system may include an source assembly and at least one image capture device 224 for each eye of the user, the source assemblies and image capture devices 224 coupled to a single controller 226. In some embodiments, separate eye tracking systems may be implemented for each eye of the user. As used herein, determining a position of an eye also includes determining an orientation of the eye.

By tracking an orientation of a user's eye, the HMD 100 may be able to adjust the content being displayed by the display subsystem 205 to the user in order to improve clarity and immersion. The HMD 100 may also allow the user to interact with virtual content based upon the orientation of the user's eye 245 (e.g., the user may select a displayed virtual object by staring at the object). In some embodiments, the orientation of the user's eye 245 may be used to provide three-dimensional or directional audio to the user. For example, the HMD 100 may comprise an audio subsystem or be configured to provide the orientation of the user's eye 245 as determined by the eye tracking system to a separate audio system for providing three-dimensional or directional audio content to the user.

The source assembly and image capture device 224 are located within the front rigid body 105 of the HMD 100, and are coupled to the controller 226 that is configured to perform the necessary data processing for determining a position and/or orientation of the eye 245. The controller 226 may be located within the HMD 100 and/or in a separate console (e.g., the console 625 illustrated in FIG. 6).

Each source assembly comprises a plurality of illumination sources configured to emit light that may be reflected at the cornea of the eye 245. For simplicity, FIG. 2 only shows a single illumination source 222. The reflected light is then captured (e.g., as an image) by the image capture device 224. For example, when light rays emitted by the source assembly are incident upon the eye 245, the eye produces multiple reflections such as a reflection from the outer surface of the cornea and another reflection from the inner surface of the cornea, collectively referred to as corneal reflections. These reflections may be referred to as Purkinje images, wherein the reflection from the outer surface of the cornea is referred to as the first Purkinje image, and the reflection from the inner surface of the cornea is referred to as the second Purkinje image. The reflection from the outer surface of the cornea, or first Purkinje image, may also be referred to as a "glint."

In some embodiments, the illumination sources of the source assembly are arranged in a particular patterns, and light from some or all of the illumination sources form particular patterns on the eye 245. A light pattern may correspond to a particular arrangement of light beams emitted towards the eye 245 to be reflected by the cornea of the eye 245. For example, in one embodiment, the source assembly is configured to project a light pattern towards the eye 245 that comprises a plurality of distinct light beams arranged in a known pattern (e.g., a circular pattern). For example, the illumination sources may be placed around the periphery of an optical element (e.g., a lens) in the optics block 215 that directs light from the electronic display 210 toward the eye 245, and the placement may be such that the illumination source are in a circular pattern. As such, the cornea of the eye 245 may be expected to reflect a corresponding number of glints in a substantially similar pattern corresponding to the light pattern.

The source assembly comprises a plurality of illumination sources (e.g., a plurality of LEDs) configured to project light towards different locations of the eye 245. An illumination source generates light that is directed light toward the eye 245. The illumination source may emit light in a visible band (~380 nm to 750 nm), in an infrared (IR) band (~750 nm to 10 micrometers), some other portion of the electromagnetic spectrum, or some combination thereof. An illumination source may be, e.g., a light emitting diode, a microLED, an organic LED, some other light source that can generate light safe for incidence on human eyes, or some combination thereof. Distinct light beams projected towards different locations of the eye 245 by the illumination sources may form a recognizable light pattern, such as a pattern of a plurality of beams in a circular arrangement. The source assembly can project different light patterns towards the eye 245 by turning on or off different combinations of illumination sources of the source assembly. For example, in some embodiments, the source assembly comprises a first subset of illumination sources configured to project a first light pattern, and a second subset of illumination sources configured to project a second, different light pattern.

In some embodiments, the source assembly may comprise an illumination source 222 configured to create a light pattern via an imaged spatial light modulator. For example, the illumination source 222 may be able to project multiple different light beams through the spatial light modulator to produce a light pattern or a portion of a light pattern. In some embodiments, the source assembly comprises one or more illumination sources 222 able to be controllably moved or able to project a beam of light that can be controllably moved. For example, the source assembly may comprise an illumination source 222 associated with a microscanner or other microelectromechanical system (MEMS) able to direct light from the illumination source 222 in different directions to produce a light pattern or a portion of a light pattern. As such, more complex light patterns may be projected using fewer illumination sources.

In some embodiments, the light emitted by the source assembly may comprise visible light. In other embodiments, the source assembly may emit infrared light or some other type of non-visible light. In some embodiments, the source assembly may be configured to emit different types of light associated with different frequency bands.

The image capture device 224 is sensitive to light within the frequency bands emitted by the source assembly, and captures the reflected light from the outer surface of the cornea ("glints") in the captured images. Alternatively or additionally, the image capture device 224 may capture reflected light from the inner surface of the cornea. The reflections from the cornea (e.g., from inner surface and/or outer surface) are herein referred to as corneal reflections. While the present Specification may refer primarily to performing eye tracking using glints (reflections from the outer surface of the cornea), it is understood that it other embodiments, eye tracking may be performed using either cornea outer surface or inner surface reflections, or a combination thereof. In some embodiments, the image capture device 224 may be configured to filter out light having frequencies outside the frequency bands emitted by the source assembly, in order to better capture the reflected light.

The controller 226 is configured to receive one or more images of the user's eye 245 captured by the image capture device 224, and identify one or more glints corresponding to light from the source assembly reflected by the cornea of the eye 245. Because the source assembly projects light towards the cornea of the eye 245 in a predetermined light pattern, the controller 226 is able to determine a shape and/or orientation of the eye 245 based upon the locations of the glints in the captured images. For example, for different orientations of the eye 245, the light from the source assembly falls on different areas of the cornea of the eye 245, causing the glints to appear at different locations in the images captured by the image capture device 224. As such, the controller 226 may be able to determine an orientation of the eye 245 based upon positions of one or more identified glints and the predetermined light pattern.

In some embodiments, the controller 226 is configured to determine a shape of the cornea of the eye 245 based upon the identified glints from the captured images. The controller 226 may then determine an orientation of the eye 245 based upon the determined cornea shape and the locations of the identified glints in subsequent captured images.

In some embodiments, one or more glints associated with a projected light pattern may be obscured. For example, in certain orientations, the pupil of the eye 245 may obscure one or more glints of a projected light pattern. In order to ensure that the controller 226 is able to identify enough glints for use in eye tracking, the source assembly may be configured to generate at least two different light patterns time-multiplexed over at least two different time periods. For example, the source assembly may project a first light pattern over a first time period, and a second light pattern over a second, subsequent time period. The light patterns may be configured such that the first and second light patterns are projected towards different locations of the eye 245, such that for a given orientation of the eye 245, if one or more glints of the first light pattern are obscured for at the orientation, none of the glints of the second light pattern are likely to be obscured, allowing for the controller 226 to determine the shape and/or orientation of the eye 245 using a sufficient number of identified glints.

Eye Tracking System

Figure 3:
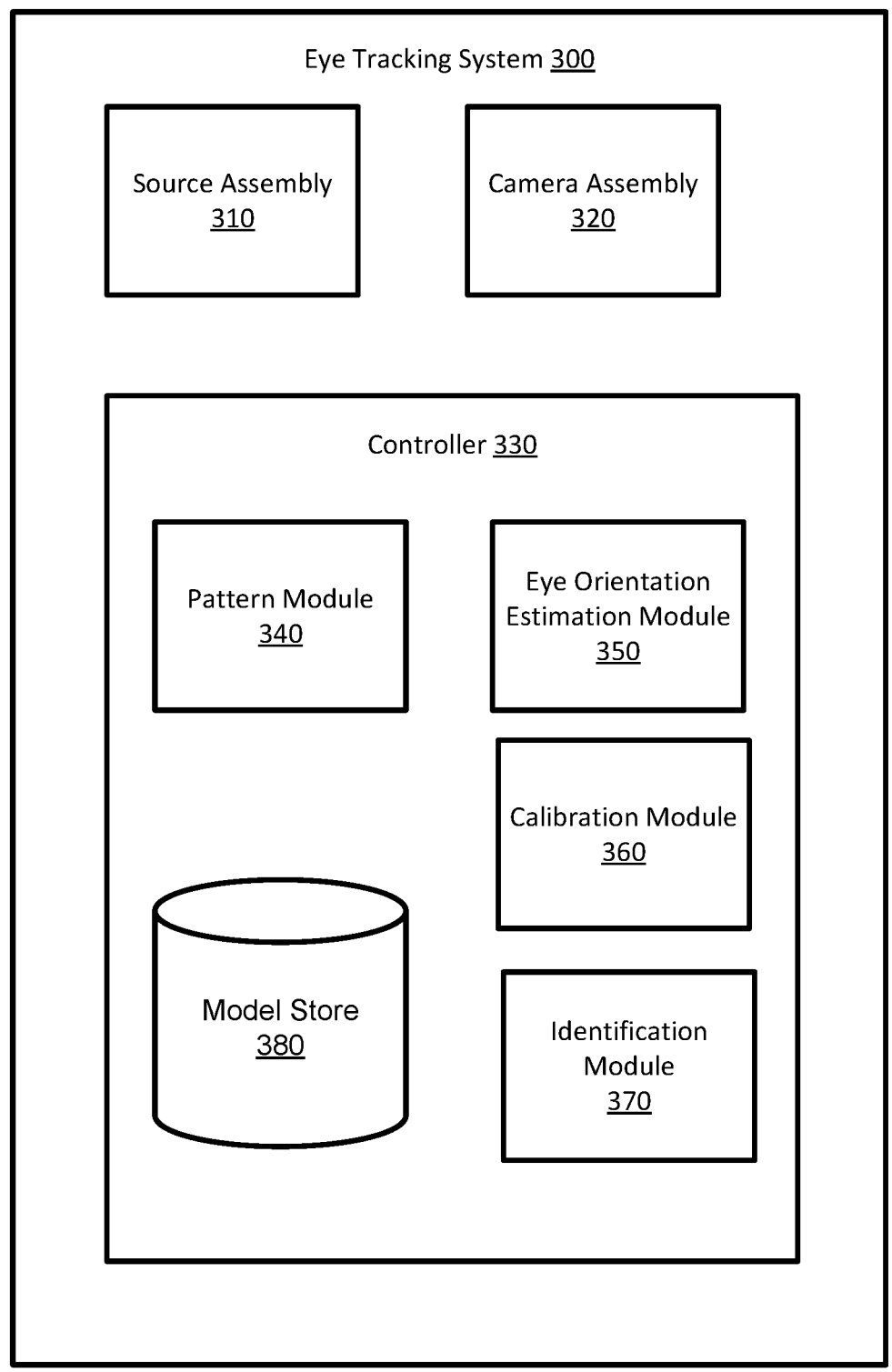
FIG. 3 is a block diagram of an eye tracking system, in accordance with an embodiment.

FIG. 3 is a block diagram of an eye tracking system, in accordance with an embodiment. The eye tracking system 300 comprises a source assembly 310, a camera assembly 320, and a controller 330. In other embodiments, the content augmentation module 160 comprises additional or fewer modules than those described herein. Similarly, the functions can be distributed among the modules and/or different entities in a different manner than is described here.

The source assembly 310 comprises a plurality of illumination sources. The source assembly 310 is an embodiment of the source assembly described above with regard to FIG. 2. Each illumination source of the source assembly 310 may be configured to project light in a different direction such that one or more different light patterns may be projected towards an eye of a user. The illumination sources may project light in a visible frequency band or a non-visible frequency band (e.g., infrared). The source assembly 310 is configured to emit different light patterns at different time periods in accordance with a set of emission instructions (described in greater detail below). Each of the different light patterns is associated with a different set of glints that are reflected by the cornea of the eye. For example, the source assembly 310 may comprise a plurality of illumination sources, wherein the first light pattern is projected by a first subset of the plurality of illumination sources, and the second light pattern is projected by a second subset of the plurality of illuminations sources.

The camera assembly 320 captures images of one or both eyes of a user in accordance with imaging instructions. Imaging instructions are instructions that control operation of the camera assembly 320. Imaging instructions can include, e.g., frame rate, aperture setting, gain setting, focus setting, image timing, some other parameters that control operation of one or more image captured devices, or some combination thereof. In some embodiments, imaging instructions can also be directed toward specific image capture devices. In some embodiments, some or all of the imaging instructions may be determined by the camera assembly 320 and/or its image capture devices. For example, exposure settings (e.g., focus, aperture, gain) can be determined by the camera assembly and image timing may be determined by the controller 330. For example, the camera assembly 320 may receive imaging instructions from the controller 330 specifying at what times images may be captured (e.g., during the first time period when the source assembly 310 projects the first light pattern towards the user's eye, and during the second time period when the source assembly 310 projects the second light pattern towards the user's eye).

The camera assembly 320 comprises one or more image capture devices for capturing images of the user's eye on which the one or more light patterns may be projected. In some embodiments the image capture device 224 is an embodiment of the camera assembly 320. The one or more image capture devices are able to capture images in a frequency band corresponding to the illumination sources. In some embodiments, the one or more image capture devices of the camera assembly 320 are configured to filter out one or more frequencies outside the frequency band corresponding to the illumination sources. An image capture device may include a digital image sensor (e.g., CCD, CMOS) and an optical element. The optical element may be one or more lenses, a high-pass, low-pass, or band-pass filter, a polarizer, an aperture stop, a diaphragm, some other optical element suitable for processing IR light, or some combination thereof. The optical element outputs light which is captured and converted into a digital signal by the digital sensor.

The controller 330 controls the source assembly 310 and the camera assembly 320. In some embodiments the controller 226 is an embodiment of the controller 330. The controller 330 can instruct the source assembly 310 to project at least two different light patterns over at least two different time periods towards the eye of the user. In addition, the controller 330 can instruct the camera assembly 320 to capture one or more images of the user's eye during the at least two different time periods. For example, the source assembly 310 may be configured to project a first light pattern during a first time period, and a second light pattern during a second time period. The camera assembly 320 may be configured to capture at least one image of the eye during the first time period usable to identify glints corresponding to the first light pattern, and at least one image during the second time period usable to identify glints corresponding to the second light pattern.

The controller 330 may comprise a pattern module 340, an eye orientation estimation module 350, a calibration module 360, an identification module 370, and a model store 380. In other embodiments, the controller 330 comprises additional or fewer modules than those described herein. Similarly, the functions can be distributed among the modules and/or different entities in a different manner than is described here.

The model store 380 comprises a database or other type of storage device configured to store one or more eye models, each eye model indicating a cornea shape of an eye of a particular user. In some embodiments, the stored eye models may be used to authenticate a user of the HMD. For example, different users may have different cornea shapes. By constructing an eye model of the user (described in greater detail below in relation to the calibration module 360) and comparing the constructed eye model with one or more stored eye models, an identity of the user may be determined. In some embodiments, the model store 380 may also store a default eye model, which may be used for eye tracking purposes when an eye model corresponding to a current user cannot be constructed.

The pattern module 340 generates emission instructions, which are instructions that control light patterns emitted by the source assembly 310 towards the eye of a user of the HMD. For example, the emission instructions control which light patterns are projected by the source assembly 310 over which time periods. In some embodiments, the light patterns may be selected based upon expected locations of glints correspond to the light pattern. For example, the emission instructions may instruct the source assembly 310 to project light patterns expected to result in glints reflected from a plurality of different locations on the eye, or wherein the majority of expected glints are expected to not be obscured over one or more probable eye orientations.

The emission instructions are configured to instruct the source assembly 310 to project at least two different light patterns in a time-multiplexed fashion. The use of time-multiplexing of different light patterns may allow the controller 330 to determine a shape or orientation of the eye, even if some of the glints of the captured images are obscured. For example, at certain eye orientations, one or more of the glints may fall over the pupil of the eye, and as a result may not be visible in the images captured by the camera assembly 320. In other cases, the user may blink as the camera assembly 320 is capturing an image of the eye, covering the cornea of the eye and preventing any detectable glints from appearing in the captured image.

The pattern module 340 implements time-multiplexing by generating emission instructions for the source assembly 310 to project the first light pattern towards the eye over a first period of time, and to project the second light pattern towards the eye over a second, different period of time. The controller 330 also generates imaging instructions which instruct the camera assembly 320 to capture images of the eye during the first time period and the second time period, in order to identify the glints resulting from each of the projected first and second light patterns. The controller 330 then determines an orientation of the eye using the eye orientation estimation module 350 (described in greater detail below), based upon the identified glints from the captured images corresponding to the first light pattern and/or the second light pattern.

In some embodiments, certain glints reflected by the user's eye may be considered to be more accurate in comparison to certain other glints. For example, the location of glints reflected from certain portions of the user's eye may be determined more accurately in comparison with glints reflected from other portion of the user's eye (e.g., due to different background conditions over different portions of the user's eye). When time multiplexing by projecting different light patterns over different time periods, on-time preference may be given to illumination sources associated with the more accurate glints, potentially reducing power requirements and increasing performance.

In some embodiments, due to safety concerns, the maximum amount of power that may be directed at the user's eye may be limited over a particular time period. As such, the number and/or intensity of the light beams projected towards the user's eye at any given time may be limited. By switching between different light patterns over different time periods, individual light patterns may be projected at higher power while remaining within eye safety limits, compared to if the different light patterns were projected at the same time. Light patterns projected at a higher power level may result in better signal-to-noise ratio (SNR) and glints that are easier to detect.

In addition, time multiplexing such that not all light patterns are projected at the same time may also improve SNR by reducing a likelihood of interference between the glints from different light patterns. In some embodiments, by not projecting light patterns over certain portions of the eye over certain time periods, a more accurate background image of the eye may be collected and compared to images of when the glints are reflected from the eye, potentially improving SNR and glint detection.

In an embodiment, the controller 330 (e.g., at the eye orientation estimation module 350) determines whether one or more glints are missing from a captured image of a particular light pattern. For example, the pupil of the eye may, for certain orientations of the eye, obscure one or more glints of a particular projected light pattern (e.g., the first light pattern). In response to a determination that one or more glints are obscured from the captured image of the first light pattern, the pattern module 340 may generate emission instructions instructing the source assembly 310 to project the second light pattern towards the eye over the second time period, such that the orientation of the eye may be determined based upon the glints associated with the second light pattern. In some embodiments, the controller 330, using the eye orientation estimation module 350, determines the orientation of the eye based upon identified glints from the first light pattern and the second light pattern.

In some embodiments, the pattern module 340 generates emission instructions instructing the source assembly 310 to alternately project respective first and second light patterns towards the eye based upon a time-multiplexing scheme. As such, the first and second light patterns are projected in an alternating arrangement regardless of whether any glints of the first or second light patterns are determined to be obscured. The controller 330, using the eye orientation estimation module 350, may determine an orientation of the eye based upon identified glints associated with the first light pattern, the second light pattern, or some combination thereof.

In some embodiments, the first and second time periods during which the first and second light patterns are respectively projected as specified by the emission instructions may be configured to be short enough such that the eye is not expected to move significantly during the first and second time periods. For example, in some embodiments the emission instructions instruct the source assembly 310 to switch between projecting the first light pattern and the second light pattern at a rate of 3 kHz. In some embodiments, the duration of the first time period or the second time period may have a median value of no greater than 1 s, preferably no more than 0.1 s, and most preferably no more than 0.01 s. The controller 330 may be configured to determine the orientation of the eye under the assumption that the eye maintains the same orientation during each of the one or more images captured by the camera assembly 320 over the first and second time periods.

In some embodiments, the emission instructions may instruct the illumination sources of the source assembly 310 to project or not project light at an individual level, in order to reflect or not reflect certain glints from the eye. In some embodiments, it may be more desirable to reflect glints off of certain portions of the eye (e.g., portions where the glints are easier to detect, less likely to be obscured, and/or the like) compared to other portions of the eye. As such, the emission instructions may instruct the source assembly 310 to only project light beams corresponding to the glints expected to be reflected from the desired portions of the eye. In some embodiments, a glint may be determined to reflect from a desired portion of the eye based on a previously calculated position of the eye. In some embodiments, illumination sources of the source assembly 310 may be turned on or off depending upon whether the illumination sources falls within an expected field of view of the eye.

In some embodiments, the emission instructions may instruct the source assembly 310 to emit first and second light patterns that at least partially overlap. For example, one or more illumination sources may be configured to project light as part of both the first light pattern and the second light pattern, while one or more other illumination sources may be configured to project light only as part of the first light pattern, or only part of the second light pattern. In some embodiments, the emission instructions may instruct the source assembly 310 to project the first light pattern over the first time period and the second light pattern over the second time period, wherein the first and second time periods at least partially overlap.

Although the above primarily discusses the emission instructions instructing the source assembly 310 to emit two different light patterns multiplexed over two different time periods, it is understood that in other embodiments, the emission instructions may instruct the source assembly 310 to emit more than two different light patterns over more than two different time periods. In addition, the imaging instructions may instruct the camera assembly 320 to capture at least one image over each of the more than two different time periods.

The eye orientation estimation module 350 receives one or more images captured by the camera assembly 320 of the user's eye, and identifies the locations of a plurality of glints in the one or more received images. The eye orientation estimation module 350 determines an orientation of the eye based upon the identified glint locations and the one or more predetermined light patterns projected by the source assembly 310. In some embodiments, the eye orientation estimation module 350 determines the orientation of the eye further based upon a model indicating a shape of the eye's cornea (which may be generated using the calibration module 360, described in greater detail below). For example, in some embodiments, the eye orientation estimation module 350 compares the locations of the identified glints with expected glint locations corresponding to different combinations of light patterns and eye orientations, in order to determine an eye orientation where the expected glint locations correspond to the light pattern(s) projected by the source assembly 310 most closely match the locations of the identified glints in the received images. In some embodiments, the eye orientation estimation module 350 may construct and/or update a model indicating expected glint locations for different light patterns and eye orientations, based upon the eye model of the user's eye or a default eye shape model.

As discussed above, the eye orientation estimation module 350 may in some embodiments determine if one or more glints are missing from a captured image. For example, the eye orientation estimation module 350 may determine that a glint is missing if the number of identified glints from a received captured image does not match a number of expected glints corresponding to the projected light pattern. In some embodiments, if the eye orientation estimation module 350 determines that one or more glints are missing from a captured image associated with the first light pattern, then the eye orientation estimation module 350 may determine an eye orientation using the identified glints from captured images associated with the second light pattern. In some embodiments, the eye orientation estimation module 350 may use the identifiable glints associated with the first light pattern and the second light pattern to determine an orientation of the eye.

The calibration module 360 generates or trains a model of the eye prior to eye tracking, wherein the model of the eye indicates a shape of the user's cornea. In some embodiments, the calibration module 360 trains the model during a calibration sequence performed prior to eye tracking. In some embodiments, the calibration module 360 repeatedly scans the eye with the camera assembly 320 during a calibration sequence (e.g., by identifying the locations of a plurality of glints on the user's eye corresponding to a predetermined light pattern projected by the source assembly 310). For example, the user is instructed to look at a certain virtual object or visual indicator displayed on the electronic display of the HMD. One or more predetermined light patterns are projected towards the user's eye while the user is looking at the visual indicator, allowing for glints corresponding to the light pattern to be identified on images captured by the camera assembly 320 while the eye is in a known orientation. These identified glint locations may be analyzed to construct a model of the eye indicating a shape of the user's cornea. The model may be stored in the model store 380. After the calibration module 360 generates the model, the eye orientation estimation module 350 may subsequently track the user's eye. In some embodiments, the calibration module 360 updates the model during eye tracking.

The identification module 370 may be used to identify a user based upon a shape of the user's cornea. In some embodiments, the identification module 370 receives the model of the user's eye (e.g., from the calibration module 360) and compares the model against one or more stored eye models corresponding to known users. For example, the model store 380 may store a plurality of eye models that have been generated by the calibration module 360 for different users. When the calibration module constructs an eye model for a current user, the identification module 370 may compare the constructed model with the plurality of eye models stored by the model store 380 to determine a similarity score between the constructed model and each of the plurality of stored models (e.g., by comparing one or more features of the constructed and stored eye models, such as a radius of the eye, degree of curvature of the cornea, and/or the like). If a similarity between the constructed model and a stored model exceeds a threshold amount, the user may be identified as the same user associated with the stored model. In some embodiments, if a user is identified as being associated with the stored model, the constructed model may not be separately stored in the model store 380. In some embodiments, the user may be identified through a combination of different identification techniques, such as iris recognition, fingerprint verification, and/or the like.

Figure 4A:
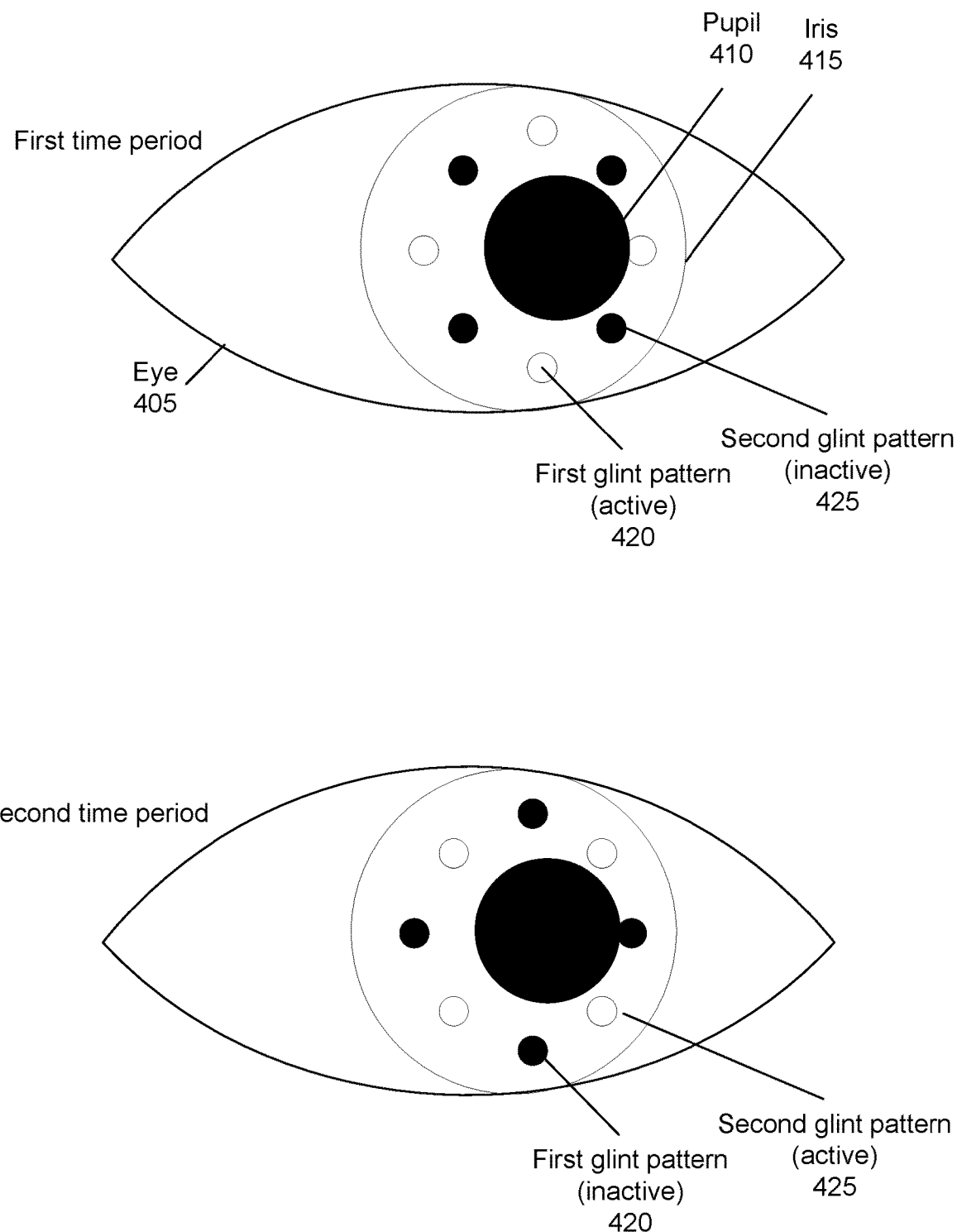
FIG. 4A illustrates an example of time-multiplexed light patterns that may be projected on an eye, in accordance with an embodiments.

FIG. 4A illustrates an example of time-multiplexed light patterns that may be projected on an eye, in accordance with an embodiments. FIG. 4A illustrates an eye 405 having an iris 410 and a pupil 415 oriented in a first orientation. The iris 410 and the pupil 415 are covered by a transparent cornea (not shown).

During a first time period, an source assembly (e.g., source assembly 310) of an eye tracking system (e.g., the eye tracking system 300) projects a first light pattern towards the eye 405, causing the cornea of the eye 405 to reflect a first pattern of glints 420 that may be captured on one or more images by device camera assembly (e.g., the camera assembly 320). In addition, during the first time period, the source assembly does not project a second light pattern towards the eye 405 that would cause the cornea of the eye 405 to reflect a second pattern of glints 425. As such, an image of the eye 405 captured by an image capture device of the eye tracking system during the first time period may be used to identify the first pattern of glints 420 but not the second pattern of glints 425 (during the first time period).

During a second time period, the source assembly is configured to project the second light pattern towards the eye 405, causing the cornea of the eye 405 to reflect the second pattern of glints 425. In addition, the source assembly does not project the first light pattern during the second time period, such that the cornea of the eye 405 does not reflect the first pattern of glints 420. As such, an image of the eye 405 captured by the camera assembly during the second time period is usable to identify the second pattern of glints 425 but not the first pattern of glints 420 (during the second time period).

In some embodiments, such as that illustrated in FIG. 4A, none of the glints of the first pattern of glints 420 or the second pattern of glints 425 are obscured during the first and second time periods. The eye tracking system may thus determine the orientation of the eye 405 based upon the first pattern of glints 420, the second pattern of glints 425, or a combination thereof.

Figure 4B:
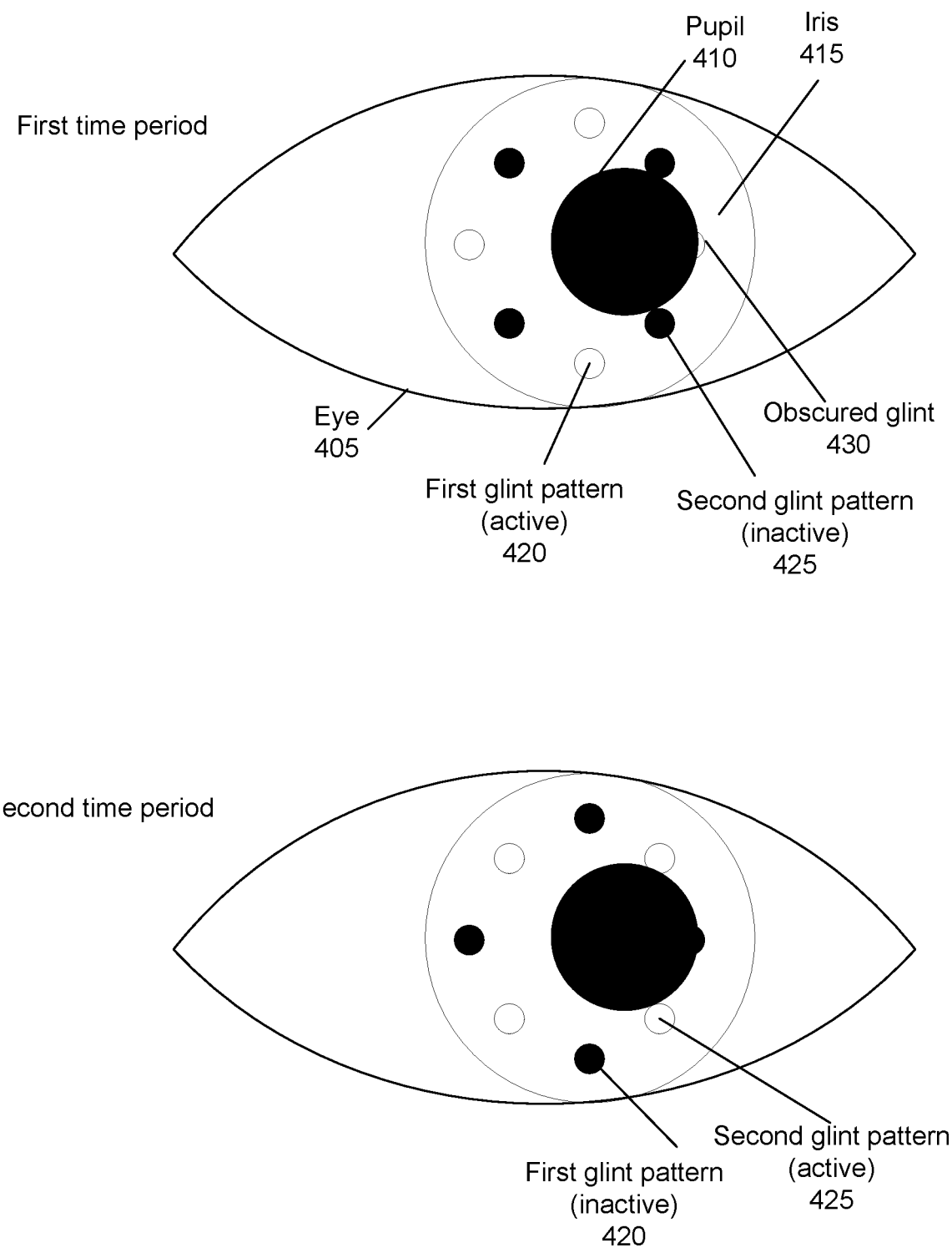
FIG. 4B illustrates another example of time-multiplexed light patterns that may be projected on the eye, when the eye is in a second orientation.

FIG. 4B illustrates another example of time-multiplexed light patterns that may be projected on the eye, when the eye is in a second orientation. In the second orientation of the eye 405, one or more glints of the first pattern of glints 420 may be obscured. For example, as illustrated in FIG. 4B, a glint 430 of the first pattern of glints 420 may be at least partially obscured by the pupil 410 of the eye 405 when the first pattern is projected during the first time period. As such, the controller may not be able to identify the glint 430 from captured images of the eye 305 taken during the first time period.

On the other hand, the pupil 410 of the eye 405 does not obscure any of the second pattern of glints 425 reflected from the second light pattern projected during the second time period. As such, the controller may be able to identify all the glints from the second pattern of glints 425 from captured images of the eye 405 taken during the second time period. The controller may thus determine an orientation of the eye 405 based upon the identified second pattern of glints 425.

In some embodiments, the eye 405 may be oriented such that at least some glints of both the first pattern of glints 420 and the second pattern of glints 425 are obscured when projected during their respective time periods. And as discussed above with regard to FIG. 3, the controller may be configured to determine a shape and/or orientation of the eye 405 based upon the identifiable non-obscured glints of the first and second glint patterns 420 and 425.

Figure 5:
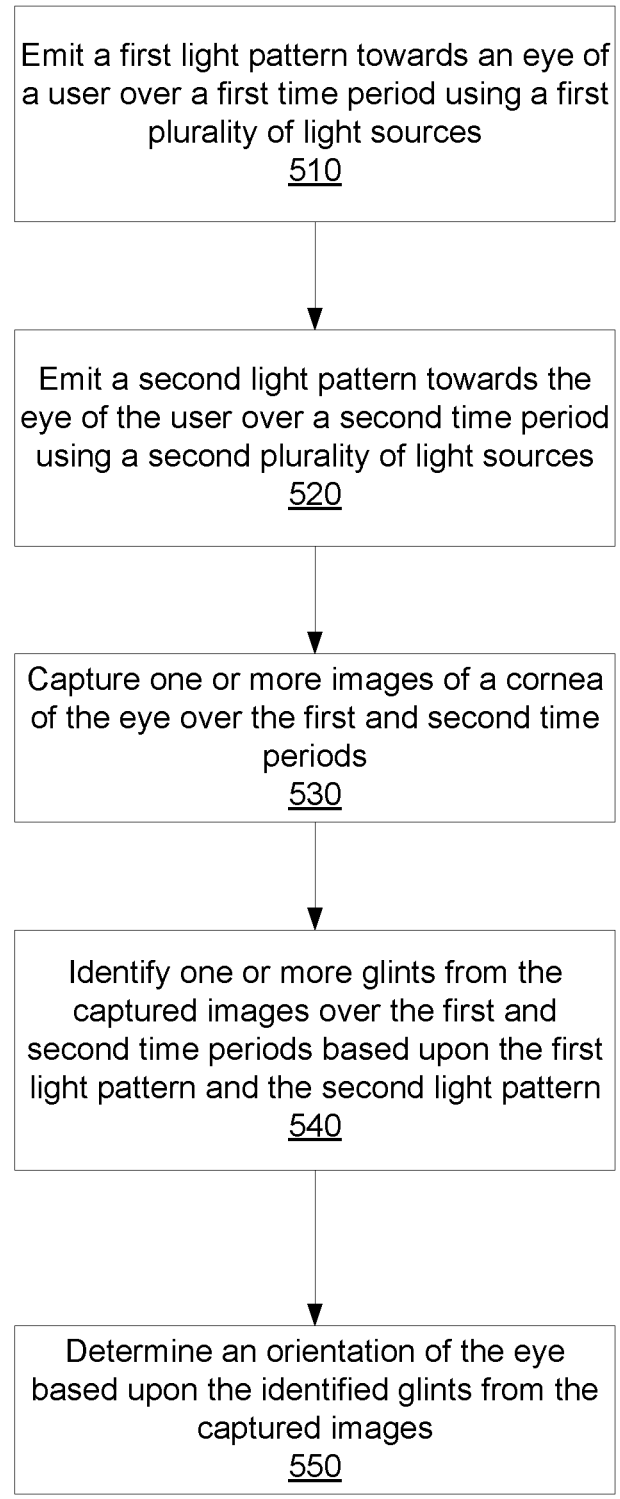
FIG. 5 is a flowchart of an example process for eye tracking using time multiplexing, in accordance with an embodiment.

FIG. 5 is a flowchart of an example process for performing eye tracking using time multiplexing, in accordance with an embodiment. The example eye tracking process may be performed by the eye tracking system illustrated in FIG. 3. In some embodiments, the eye tracking system may be part of the HMD 100 and/or a separate console (e.g., console 625 illustrated in FIG. 6). Other entities may perform some or all of the steps of the process in other embodiments. Likewise, embodiments may include different and/or additional steps, or perform the steps in different orders.

The eye tracking system emits 510 a first light pattern towards an eye of a user over a first time period using a first plurality of light sources. The first plurality of light sources may correspond to at least a portion of the source assembly 310 illustrated in FIG. 3. In some embodiments, the first light pattern may correspond to one or more light beams directed towards different locations on a user's eye. In some embodiments, the one or more light beams may comprise visible light, infrared light, or some other type of non-visible light. The first light pattern may be configured to cause the cornea of the user's eye to reflect a first pattern of glints or other types of reflections.

The eye tracking system emits 520 a second light pattern towards the eye of the user over a second time period using a second plurality of light sources. The second light pattern may be configured to cause the cornea of the user's eye to reflect a second pattern of glints or other types of reflections that is different from the first pattern of glints. For example, the second pattern of glints may correspond to different locations compared to the first pattern of glints. In some embodiments, the second plurality of light sources is mutually exclusive from the first plurality of light sources. In other embodiments, at least one light source may be part of both the first plurality and the second plurality of light sources, such that the first light pattern and the second light pattern may share at least one light beam directed toward the same location of the user's eye.

The eye tracking system captures 530 one or more images of a cornea of the eye over the first and second time periods using an image capture device. In some embodiments, the image capture device may capture multiple images of the eye over each of the first and second time periods.

The eye tracking system identifies 540 one or more glints from the images captured by the image capture device over the first and second time periods, based upon the first light pattern and the second light pattern. In some embodiments, glints in the captured images may be identified by analyzing the captured images for areas of contrast consistent with a glint. In some embodiments, a captured image may be compared with one or more images of the user's eye captured when no light pattern is being projected (and thus would not contain any glints) in order to identify glints in the captured image.

In some embodiments, the eye tracking system may be able to identify all the glints corresponding to the first light pattern and the second light pattern. In some embodiments, the eye tracking system may not be able to identify all the glints corresponding to the first light pattern and the second light pattern, due to at least one glint of the first light pattern or the second light pattern being obscured. For example, the user's eye may have an orientation such as the pupil of the user's eye obscures one or more glints of the first light pattern or the second light pattern. In some embodiments, the user may be blinking, causing an eyelid of the user to cover at least a portion of the user's cornea, thus preventing reflection of one or more glints of the first or second light patterns.

The eye tracking system determines 550 an orientation of the eye based upon the identified glints from the captured images. In some embodiments, the eye tracking system determines the orientation of the eye using identified glints associated with the first light pattern, identified glints associated with the second light pattern, or a combination thereof. For example, in some embodiments, the eye tracking system determines that one or more glints associated with the first light pattern are obscured or otherwise cannot be identified, while all glints associated with the second light pattern can be identified. As such, the eye tracking system may determine the orientation of the eye using the identified glints associated with the second light pattern. In some embodiments, the eye tracking system may determine the orientation of the eye based at least in part upon glints of the first light pattern, even if one or more of the glints are obscured. In some embodiments where one or more glints associated with the first light pattern and one or more glints associated with the second light pattern are both obscured, the eye tracking system may determine the orientation of the eye based upon a combination of identifiable glints associated with the first light pattern and identifiable glints associated with the second light pattern. In some embodiments, the eye tracking system may determine that a threshold number of glints are identifiable before determining the orientation of the eye. In such cases, if less than the threshold number of glints associated with the first and second light patterns are identifiable, the eye tracking system may delay determination the orientation of the eye until additional images of the eye are captured over subsequent time periods from which at least the threshold number of glints can be identified.

In some embodiments, in addition to determining an orientation of the eye of the user based upon the identified glints, the eye tracking system may also be able to determine a shape of the cornea of the user's eye. For example, a first light pattern projected towards an eye of a first user in a first orientation may produce a first pattern of glints, while the first light pattern projected towards an eye of a second user in the first orientation may produce a second, different pattern of glints, due to different cornea shapes of the eyes of the first and second users.

As such, in some embodiments, the eye tracking system may be able to use the determined cornea shape to identify or authenticate the user. For example, the eye tracking system may access a data source storing data indicating the cornea shapes of one or more different users, and compare the determined cornea shape against the stored cornea shape to identify the user or to verify an identity of the user. In some embodiments, cornea shape may be combined with other parameters, such as iris recognition, fingerprint verification, one or more authentication parameters received from the user (e.g., username, password), and/or the like, in order to identify or authenticate the user of the HMD.

HMD System Overview

Figure 6:
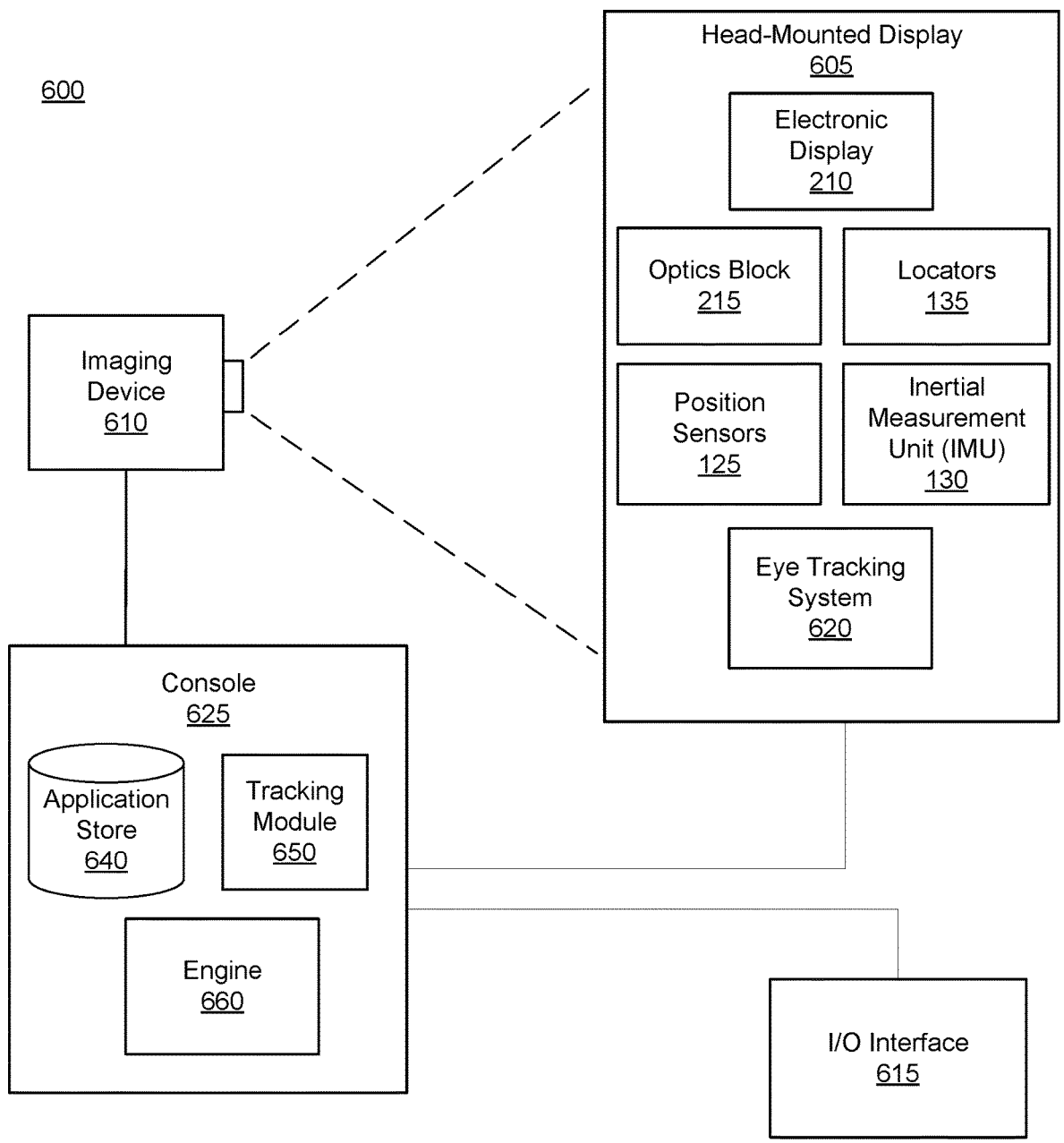
FIG. 6 is a block diagram of a HMD system, in accordance with an embodiment.

FIG. 6 is a block diagram of an HMD system 600 in accordance with an embodiment. The system 600 may be for use as a virtual reality (VR) system, an augmented reality (AR) system, a mixed reality (MR) system, or some combination thereof. In this example, the system 600 includes a HMD 605, an imaging device 610, and an I/O interface 615, which are each coupled to a console 625. While FIG. 6 shows a single HMD 605, a single imaging device 610, and a single I/O interface 615, in other embodiments, any number of these components may be included in the system. For example, there may be multiple HMDs 600 each having an associated I/O interface 615 and being monitored by one or more imaging devices 610, with each HMD 605, I/O interface 615, and imaging devices 610 communicating with the console 625. In alternative configurations, different and/or additional components may also be included in the system 600.

The HMD 605 may act as a VR, AR, and/or a MR HMD. An MR and/or AR HMD augments views of a physical, real-world environment with computer-generated elements (e.g., images, video, sound, etc.). The HMD 605 presents content to a user. In some embodiments, the HMD 605 is an embodiment of the HMD 100 described above with reference to FIG. 1. Example content includes images, video, audio, or some combination thereof. In some embodiments, audio content may be presented via a separate device (e.g., speakers and/or headphones) external to the HMD 605 that receives audio information from the HMD 605, the console 625, or both. The HMD 605 includes the electronic display 210, the optics block 215, the one or more locators 135, the position sensors 125, the internal measurement unit (IMU) 130, and an eye tracking system 620 (which may correspond to the eye tracking system 300 described above with regard to FIG. 3). In some embodiments, portions of the eye tracking system 620 may be implemented on the console 625 instead of the HMD 605. For example, in some embodiments, the source assembly 310 and the camera assembly 320 may be implemented as part of the HMD 605, while the controller 330 for the eye tracking system 620 may be implemented on the console 625 or other component separate from the HMD 605.

The electronic display 210 displays 2D or 3D images to the user in accordance with data received from the console 625. In various embodiments, the electronic display 210 comprises a single electronic display or multiple electronic displays (e.g., a display for each eye of a user). Examples of the electronic display 210 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof. In some embodiments, the electronic display 210 includes an augmented memory. The memory may be large enough to accommodate high frame rate of augmented content. For example, the memory may be large enough such that it stores at least two successive frames of image data.

The optics block 215 magnifies received light, corrects optical errors associated with the image light, and presents the corrected image light is presented to a user of the HMD 605. An optical element may be an aperture, a Fresnel lens, a convex lens, a concave lens, a filter, or any other suitable optical element that affects the blurred image light. Moreover, the optics block 215 may include combinations of different optical elements. In some embodiments, one or more of the optical elements in the optics block 215 may have one or more coatings, such as anti-reflective coatings.

In some embodiments, magnification of the image light by the optics block 215 allows the electronic display 210 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. Additionally, in some embodiments, the amount of magnification may be adjusted by adding or removing optical elements.

The optics block 215 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 210 for display is pre-distorted, and the optics block 215 corrects the distortion when is receives image light from the electronic display 210 generated based on the content.

The locators 135 are objects located in specific positions on the HMD 605 relative to one another and relative to a specific reference point on the HMD 605. A locator 135 may be a light emitting diode (LED), a corner cube reflector, a reflective marker, a type of light source that contrasts with an environment in which the HMD 605 operates, or some combination thereof. Active locators 135 (e.g., an LED or other type of light emitting device) may emit light in the visible band (~380 nm to 440 nm), in the infrared (IR) band (~440 nm to 1 mm), in the ultraviolet band (10 nm to 380 nm), some other portion of the electromagnetic spectrum, or some combination thereof.

The locators 135 can be located beneath an outer surface of the HMD 605, which is transparent to the wavelengths of light emitted or reflected by the locators 135 or is thin enough not to substantially attenuate the wavelengths of light emitted or reflected by the locators 135. Further, the outer surface or other portions of the HMD 4605 can be opaque in the visible band of wavelengths of light. Thus, the locators 135 may emit light in the IR band while under an outer surface of the HMD 605 that is transparent in the IR band but opaque in the visible band.

The IMU 130 may be an electronic device that generates fast calibration data based on measurement signals received from one or more of the position sensors 125, which generate one or more measurement signals in response to motion of HMD 605. Examples of the position sensors 1250 include accelerometers, gyroscopes, magnetometers, other sensors suitable for detecting motion, correcting error associated with the IMU 130, or some combination thereof.

Based on the measurement signals from the position sensors 125, the IMU 130 generates fast calibration data indicating an estimated position of the HMD 605 relative to an initial position of the HMD 605. For example, the position sensors 125 include multiple accelerometers to measure translational motion (forward/back, up/down, left/right) and multiple gyroscopes to measure rotational motion (e.g., pitch, yaw, and roll). The IMU 130 can, for example, rapidly sample the measurement signals and calculate the estimated position of the HMD 605 from the sampled data. For example, the IMU 130 integrates measurement signals received from the accelerometers over time to estimate a velocity vector and integrates the velocity vector over time to determine an estimated position of a reference point on the HMD 605. The reference point is a point that may be used to describe the position of the HMD 605. While the reference point may generally be defined as a point in space, in various embodiments, a reference point is defined as a point within the HMD 605 (e.g., a center of the IMU 130). Alternatively, the IMU 130 provides the sampled measurement signals to the console 625, which determines the fast calibration data.

The IMU 130 can additionally receive one or more calibration parameters from the console 625. As further discussed below, the one or more calibration parameters are used to maintain tracking of the HMD 605. Based on a received calibration parameter, the IMU 130 may adjust one or more of the IMU parameters (e.g., sample rate). In some embodiments, certain calibration parameters cause the IMU 130 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The eye tracking system 650 may be used to determine a shape and/or orientation of an eye of the user. As described above with regard to FIG. 3, the eye tracking system 650 may comprise at least one illumination source, one or more image capture devices, and a controller. The illumination source may be configured to project one or more different light patterns towards an eye of the user. The image capture devices are configured to capture images of the eye of the user, which may include one or more glints corresponding to reflections of portions of the projected light patterns off the cornea of the user's eye. The controller may receive the captured images and identify at least a portion of the one or more glints, which may be used to determine the shape and/or orientation of the user's eye.

The imaging device 610 may generate slow calibration data in accordance with calibration parameters received from the console 625. Slow calibration data includes one or more images showing observed positions of the locators 135 that are detectable by imaging device 610. The imaging device 610 may include one or more cameras, one or more video cameras, other devices capable of capturing images including one or more locators 135, or some combination thereof. Additionally, the imaging device 610 may include one or more filters (e.g., for increasing signal to noise ratio). The imaging device 610 is configured to detect light emitted or reflected from the locators 435 in a field of view of the imaging device 610. In embodiments where the locators 135 include passive elements (e.g., a retroreflector), the imaging device 610 may include a light source that illuminates some or all of the locators 135, which retro-reflect the light towards the light source in the imaging device 610. Slow calibration data is communicated from the imaging device 610 to the console 625, and the imaging device 610 receives one or more calibration parameters from the console 625 to adjust one or more imaging parameters (e.g., focal length, focus, frame rate, ISO, sensor temperature, shutter speed, aperture, etc.).

The I/O interface 615 is a device that allows a user to send action requests to the console 625. An action request is a request to perform a particular action. For example, an action request may be to start or end an application or to perform a particular action within the application. The I/O interface 615 may include one or more input devices. Example input devices include a keyboard, a mouse, a game controller, or any other suitable device for receiving action requests and communicating the received action requests to the console 625. An action request received by the I/O interface 615 is communicated to the console 625, which performs an action corresponding to the action request. In some embodiments, the I/O interface 615 may provide haptic feedback to the user in accordance with instructions received from the console 625. For example, haptic feedback is provided by the I/O interface 615 when an action request is received, or the console 425 communicates instructions to the I/O interface 615 causing the I/O interface 615 to generate haptic feedback when the console 425 performs an action.

The console 625 provides content to the HMD 605 for presentation to the user in accordance with information received from the imaging device 610, the HMD 605, or the I/O interface 615. In some embodiments, the console 625 includes an application store 640, a tracking module 650, and an engine 660. In some embodiments, the console 625 have different or additional modules than those described in conjunction with FIG. 6. Similarly, the functions further described below may be distributed among components of the console 625 in a different manner than is described here.

The application store 640 stores one or more applications for execution by the console 625. An application is a group of instructions, that when executed by a processor, generates content for presentation to the user. Content generated by an application may be in response to inputs received from the user via movement of the HMD 605 or the I/O interface 615. Examples of applications include gaming applications, conferencing applications, video playback application, or other suitable applications.

The tracking module 650 calibrates the system 600 using one or more calibration parameters and may adjust one or more calibration parameters to reduce error in determining position of the HMD 605. For example, the tracking module 450 adjusts the focus of the imaging device 410 to obtain a more accurate position for observed locators 135 on the HMD 605. Moreover, calibration performed by the tracking module 450 also accounts for information received from the IMU 130. Additionally, if tracking of the HMD 605 is lost (e.g., imaging device 610 loses line of sight of at least a threshold number of locators 135), the tracking module 650 re-calibrates some or all of the system 600 components.

Additionally, the tracking module 650 tracks the movement of the HMD 605 using slow calibration information from the imaging device 610 and determines positions of a reference point on the HMD 605 using observed locators from the slow calibration information and a model of the HMD 605. The tracking module 650 also determines positions of the reference point on the HMD 605 using position information from the fast calibration information from the IMU 130 on the HMD 605. Additionally, the tracking module 650 may use portions of the fast calibration information, the slow calibration information, or some combination thereof, to predict a future location of the HMD 605, which is provided to the engine 660.

The engine 660 executes applications within the system 600 and receives position information, acceleration information, velocity information, predicted future positions, or some combination thereof for the HMD 605 from the tracking module 650. Based on the received information, the engine 660 determines content to provide to the HMD 605 for presentation to the user, such as a virtual scene, one or more virtual objects to overlay onto a real world scene, etc. Additionally, the engine 660 performs an action within an application executing on the console 625 in response to an action request received from the I/O interface 615 and provides feedback to the user that the action was performed. The provided feedback may be visual or audible feedback via the HMD 605 or haptic feedback via the I/O interface 615.

In some embodiments, the engine 660 estimates one or more future positions of the HMD 605 using the fast calibration data from the HMD 605. The engine 660 generates warping parameters based on the one or more estimated future positions, and provides the warping parameters to the HMD 605 with the content.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   emitting a first light pattern towards an eye of the user over a first time period using a first plurality of light sources;
   emitting a second light pattern towards the eye over a second time period using a second plurality of light sources;
   capturing one or more images of a cornea of the eye over at least the first and second time periods;
   using the captured images, identifying a plurality of glints comprising at least one or more glints associated with the first light pattern and one or more glints associated with the second light pattern; and
   determining an orientation of the eye based upon the plurality of identified glints and an eye model associated with a particular cornea shape, the eye model corresponding to a previously-constructed eye model selected from a plurality of stored eye models based upon locations of the plurality of identified glints.

2. The method of claim 1, wherein the eye model indicates expected glint locations corresponding to different combinations of projected light patterns and orientations of the eye, based upon the particular cornea shape.

3. The method of claim 2, wherein determining the orientation of the eye based upon the plurality of identified glints and the eye model comprises comparing locations of the identified glints with expected glint locations for different orientations of the eye indicated by the eye model.

4. The method of claim 2, further comprising:
   updating the eye model based upon the one or more glints from the first time period and the one or more glints from the second time period.

5. The method of claim 1, wherein the plurality of stored eye models are associated with different respective cornea shapes.

6. The method of claim 1, further comprising:
   prompting the user to look at a visual indicator displayed at a known location during a calibration time period;
   during the calibration time period in which the user is looking at the displayed visual indicator:
      projecting one or more predetermined light patterns towards the user's eye;
      identifying a set of calibration glints associated with the one or more predetermined light patterns, based upon one or more captured images of the cornea of the eye; and
   generating or updating the eye model based upon the set of calibration glints.

7. The method of claim 1, further comprising:
   determining that a number of glints identified from the captured images are less than a threshold value; and
   responsive to the determination, delaying determination of the orientation of the eye.

8. The method of claim 1, wherein at least one light pattern of the first and second light patterns is an infrared light pattern.

9. The method of claim 1, wherein the first light pattern comprises a circular pattern of light points projected towards the eye of the user.

10. The method of claim 1, further comprising:
    alternating between emitting the first light pattern and the second light pattern over alternating first and second time periods.

11. An eye-tracking system associated with a head-mounted display (HMD) comprising:
    a source assembly that includes at least a first set of light sources and a second set of light sources that are both configured to emit light towards an eye of a user of the HMD in accordance with a set of emission instructions, wherein the first set of light sources is configured to emit a first light pattern over a first time period and the second set of light sources is configured to emit a second light pattern over a second time period;
    a camera assembly configured to capture images of a cornea of the eye over at least the first and second time periods in accordance with a set of imaging instructions; and
    a controller in communication with the source assembly and the camera assembly, and configured to:
       using the captured images, identify a plurality of glints comprising at least one or more glints associated with the first light pattern and one or more glints associated with the second light pattern; and
       determine an orientation of the eye based upon the plurality of identified glints and an eye model associated with a particular cornea shape, the eye model corresponding to a previously-constructed eye model selected from a plurality of stored eye models based upon locations of the plurality of identified glints.

12. The eye tracking system of claim 11, wherein the eye model indicates expected glint locations corresponding to different combinations of projected light patterns and orientations of the eye, based upon the particular cornea shape.

13. The eye tracking system of claim 12, wherein the controller is configured to determine the orientation of the eye based upon the plurality of identified glints and the eye model by comparing locations of the identified glints with expected glint locations for different orientations of the eye indicated by the eye model.

14. The eye tracking system of claim 12, wherein the controller is further configured to:
update the eye model based upon the one or more glints from the first time period and the one or more glints from the second time period.

15. The eye tracking system of claim 11, wherein the plurality of stored eye models are associated with different respective cornea shapes.

16. The eye tracking system of claim 11, wherein the controller is further configured to:
prompt the user to look at a visual indicator displayed at a known location during a calibration time period;
during the calibration time period in which the user is looking at the displayed visual indicator:
generate emission instructions to cause the source assembly to project one or more predetermined light patterns towards the user's eye;
identify a set of calibration glints associated with the one or more predetermined light patterns, based upon one or more images of the cornea of the eye captured by the camera assembly; and
generate or update the eye model based upon the set of calibration glints.

17. The eye tracking system of claim 11, wherein the controller is further configured to:
determine that a number of glints identified from the captured images are less than a threshold value; and
responsive to the determination, delay determination of the orientation of the eye.

18. The eye tracking system of claim 11, wherein at least one light pattern of the first and second light patterns is an infrared light pattern.

19. The eye tracking system of claim 11, wherein the first light pattern comprises a circular pattern of light points projected towards the eye of the user.

20. The eye tracking system of claim 11, wherein the set of emission instructions instructs the source assembly to:
alternate between emitting the first light pattern and the second light pattern over alternating first and second time periods.

* * * * *